(12) United States Patent
Tsai et al.

(10) Patent No.: US 12,452,915 B2
(45) Date of Patent: Oct. 21, 2025

(54) APPARATUSES AND METHODS FOR UPLINK TRANSMISSION IN FRAME-BASED EQUIPMENT (FBE) OPERATION

(71) Applicant: MEDIATEK INC., Hsinchu (TW)

(72) Inventors: Chiou-Wei Tsai, Hsinchu (TW); Timothy Perrin Fisher-Jeffes, San Jose, CA (US); Chun-Hsuan Kuo, San Jose, CA (US)

(73) Assignee: MEDIATEK INC., Hsinchu (TW)

( * ) Notice: Subject to any disclaimer, the term of this patent is extended or adjusted under 35 U.S.C. 154(b) by 484 days.

(21) Appl. No.: 17/766,886

(22) PCT Filed: Sep. 30, 2020

(86) PCT No.: PCT/CN2020/119630
§ 371 (c)(1),
(2) Date: Apr. 6, 2022

(87) PCT Pub. No.: WO2021/068849
PCT Pub. Date: Apr. 15, 2021

(65) Prior Publication Data
US 2024/0098781 A1 Mar. 21, 2024

Related U.S. Application Data

(60) Provisional application No. 62/911,420, filed on Oct. 7, 2019.

(51) Int. Cl.
H04W 74/08 (2024.01)
H04W 74/0808 (2024.01)
H04W 74/0833 (2024.01)

(52) U.S. Cl.
CPC .... H04W 74/0808 (2013.01); H04W 74/0833 (2013.01)

(58) Field of Classification Search
CPC .... G06V 10/96; G06V 10/751; G06V 10/761; G06T 7/00; G06F 18/22
See application file for complete search history.

(56) References Cited

U.S. PATENT DOCUMENTS

2016/0192396 A1    6/2016  Ng
2017/0318607 A1*  11/2017  Tiirola ............... H04W 4/10
2020/0037354 A1*   1/2020  Li ..................... H04W 74/0808

FOREIGN PATENT DOCUMENTS

CN    105991254 A    10/2016
CN    106162658 A    11/2016
(Continued)

OTHER PUBLICATIONS

International Search Report dated Dec. 30, 2020, issued in application No. PCT/CN2020/119630.
(Continued)

Primary Examiner — Walli Z Butt
Assistant Examiner — Thad N Defauw
(74) Attorney, Agent, or Firm — McClure, Qualey & Rodack, LLP

(57) ABSTRACT

A method executed by a User Equipment (UE) operating in a Frame-Based Equipment (FBE) mode is provided. The method includes the following steps: determining a starting time and a periodicity of a first Fixed Frame Period (FFP) of a cell on an operating channel of an unlicensed band; determining a starting time and a periodicity of a second FFP for initiating an uplink transmission to the cell; performing a Listen-Before-Talk (LBT) procedure on the operating channel of the unlicensed band; and performing the uplink transmission to the cell using a first uplink resource in the second FFP in response to the LBT procedure indicating that the operating channel of the unlicensed band is clear.

16 Claims, 11 Drawing Sheets

(56) References Cited

FOREIGN PATENT DOCUMENTS

| | | |
|---|---|---|
| CN | 107667565 A | 2/2018 |
| CN | 108781149 A | 11/2018 |
| WO | 2017/070953 A1 | 5/2017 |

OTHER PUBLICATIONS

VIVO; "Discussion on the channel access procedures;" 3GPP TSG RAN WG1#98bis, R1-1910204; Oct. 2019; pp. 1-10.
Mediatek Inc.; "On Channel Access Procedure;" 3GPP TSG RAN WG1 #96bis, R1-1904482; Apr. 2019; pp. 1-13.
Chinese language office action dated Jun. 7, 2024, issued in application No. CN 202080037341.X.

* cited by examiner

APPARATUSES AND METHODS FOR UPLINK TRANSMISSION IN FRAME-BASED EQUIPMENT (FBE) OPERATION

CROSS REFERENCE TO RELATED APPLICATIONS

This application claims priority of U.S. Provisional Application No. 62/911,420, filed on Oct. 7, 2019, the entirety of which is incorporated by reference herein.

TECHNICAL FIELD

The application generally relates to mobile communications and, more particularly, to apparatuses and methods for uplink transmission in Frame-Based Equipment (FBE) operation.

BACKGROUND

In a typical mobile communication environment, a User Equipment (UE) (also called Mobile Station (MS)), such as a mobile telephone (also known as a cellular or cell phone), or a tablet Personal Computer (PC) with wireless communications capability, may communicate voice and/or data signals to one or more mobile communication networks. The wireless communications between the UE and the mobile communication networks may be performed using various Radio Access Technologies (RATs), such as Global System for Mobile communications (GSM) technology, General Packet Radio Service (GPRS) technology, Enhanced Data rates for Global Evolution (EDGE) technology, Wideband Code Division Multiple Access (WCDMA) technology, Code Division Multiple Access 2000 (CDMA-2000) technology, Time Division-Synchronous Code Division Multiple Access (TD-SCDMA) technology, Worldwide Interoperability for Microwave Access (WiMAX) technology, Long Term Evolution (LTE) technology, LTE-Advanced (LTE-A) technology, etc.

These wireless technologies have been adopted for use in various telecommunication standards to provide a common protocol that enables different wireless devices to communicate on a municipal, national, regional, and even global level. An example of an emerging telecommunication standard is the 5G New Radio (NR). The 5G NR is a set of enhancements to the LTE mobile standard promulgated by the Third Generation Partnership Project (3GPP). It is designed to better support mobile broadband Internet access by improving spectral efficiency, reducing costs, and improving services.

On the other hand, with the rapid development of "Internet of Things" (IoT), the demand for supporting machine communications increases exponentially. To meet the demand of this exponential increase in mobile communications, additional spectrum (i.e. radio frequency spectrum) is needed. As the amount of licensed spectrum is limited, mobile service providers seek to combine unlicensed spectrum with their own licensed spectrum to create larger bandwidths for users. To facilitate efficient and fair sharing of unlicensed spectrum, a commonly adopted channel access mechanism based on energy detection, which is called Listen-Before-Talk (LBT), may need to be supported based on regulation in each country. Depending on regional regulation and use cases, LBT procedures can be categorized to channel sensing for a deterministic duration, or for a random duration, or without doing any channel sensing (i.e. no-LBT). In addition, there are two types of operation modes, including Frame-Based Equipment (FBE) operation and Load-Based Equipment (LBE) operation.

In FBE operation, a device (e.g., a gNB or UE) may be configured with a frame period, where the beginning of each frame corresponds to a possible starting time of a transmission by that device. If a device is operating as an initiating device, it should perform the LBT procedure before the start of a frame period to make sure the operating channel is clear. Each frame includes a Channel Occupancy Time (COT) period in which downlink and/or uplink transmission may take place, and an idle period in which the initiating device should refrain from any transmission and reception operation. In the conventional practice of FBE operation (e.g., 3GPP Release-16 NR-U FBE operation), uplink transmissions are only supported in gNB-initiated COT. That is, the gNB always needs to perform the LBT procedure and transmit some downlink signals before any UE can conduct uplink transmission. This limitation will inevitably increase latency for uplink transmissions, especially those initiated by UE and transmitted on configured uplink resources, and will disadvantageously reduce overall radio resource utilization.

BRIEF SUMMARY OF THE APPLICATION

In order to solve the aforementioned problem, the present application proposes to support UE-initiated Channel Occupancy Time (COT) for Frame-Based Equipment (FBE) operation, by allowing a UE to operate as an initiating device with a deterministic Fixed Frame Period (FFP) to conduct an uplink transmission in a way that is compliant with regional regulations (e.g., European Telecommunications Standards Institute (ET SI) regulation).

In a first aspect of the application, a method executed by a UE operating in a FBE mode is provided. The method comprises the following steps: determining a starting time and a periodicity of a first Fixed Frame Period (FFP) of a first cell on an operating channel of an unlicensed band; determining a starting time and a periodicity of a second FFP for initiating an uplink transmission to the first cell; performing a Listen-Before-Talk (LBT) procedure on the operating channel of the unlicensed band; and performing the uplink transmission to the first cell using a first uplink resource in the second FFP in response to the LBT procedure indicating that the operating channel of the unlicensed band is clear.

In a first implementation form of the first aspect, the method further comprises the following steps: determine a Channel Occupancy Time (COT) period or an idle period of the first FFP, and determine a COT period or an idle period of the second FFP.

In a second implementation form of the first aspect in combination with the first implementation form of the first aspect, the method further comprises the following step: receiving configurations from a second cell on an operating channel of a licensed band or an unlicensed band, wherein the second cell is the same or different from the first cell.

In a third implementation form of the first aspect in combination with the second implementation form of the first aspect, the periodicity of the second FFP is determined according to information configured or signaled from the first cell, or according to the received configurations from the second cell, or according to the periodicity of the first FFP, or according to a periodicity of a type of uplink resources, or a combination of the above.

In a fourth implementation form of the first aspect in combination with the second implementation form of the first aspect, the starting time of the second FFP is determined according to information semi-statically configured or dynamically signaled from the first cell, or according to the received configurations from the second cell, or according to the starting time of the first FFP, or according to the starting time of a type of uplink resources, or a combination of the above.

In a fifth implementation form of the first aspect, the starting time of the second FFP indicates an offset relative to the starting time of the first FFP, a system frame boundary, or a system subframe boundary.

In a sixth implementation form of the first aspect in combination with the second implementation form of the first aspect, the COT period or the idle period of the second FFP is determined according to information semi-statically configured or dynamically signaled from the first cell, or according to the received configuration from the second cell, or according to the COT period or the idle period of the firs FFP, or according to predefined rules, or a combination of the above.

In a seventh implementation form of the first aspect in combination with the third or fourth implementation form of the first aspect, the type of uplink resources comprise a Physical Random Access Channel (PRACH) resource for random access, a Physical Uplink Shared Channel (PUSCH) resource for configured grants, or a Physical Uplink Control Channel (PUCCH) resource for scheduling requests, Channel State Information (CSI) reporting, or Hybrid Automatic Repeat Request (HARQ) feedbacks.

In an eighth implementation form of the first aspect, the method further comprises the following steps: determining whether a downlink transmission from the first cell occurs within a duration subsequent to the starting time of the first FFP in which a second uplink resource is allocated; and performing another uplink transmission to the first cell using the second uplink resource in the first FFP in response to the downlink transmission from the first cell occurring within the duration subsequent to the starting time of the first FFP; wherein the UE is operating as an initiating device upon initiating the uplink transmission according to the second FFP, and as a responding device upon initiating the other uplink transmission according to the first FFP.

In a second aspect of the application, a UE operating in a FBE mode is provided. The UE comprises a wireless transceiver and a controller. The wireless transceiver is configured to perform wireless transmission and reception to and from a first cell of a mobile communication network. The controller is coupled to the wireless transceiver, and configured to determine a starting time and a periodicity of a first FFP of the first cell on an operating channel of an unlicensed band, determine a starting time and a periodicity of a second FFP for initiating an uplink transmission to the first cell, perform an LBT procedure on the operating channel of the unlicensed band via the wireless transceiver, and perform the uplink transmission to the first cell using a first uplink resource in the second FFP via the wireless transceiver in response to the LBT procedure indicating that the operating channel of the unlicensed band is clear.

In a first implementation form of the second aspect, the controller is further configured to determine a COT period or an idle period of the first FFP, and determine a COT period or an idle period of the second FFP.

In a second implementation form of the second aspect in combination with the first implementation form of the second aspect, the controller is further configured to receive configurations from a second cell on an operating channel of a licensed band or an unlicensed band, wherein the second cell is the same or different from the first cell.

In a third implementation form of the second aspect in combination with the second implementation form of the second aspect, the periodicity of the second FFP is determined according to information configured or signaled from the first cell, or according to the received configurations from the second cell, or according to the periodicity of the first FFP, or according to a periodicity of a type of uplink resources, or a combination of the above.

In a fourth implementation form of the second aspect in combination with the second implementation form of the second aspect, the starting time of the second FFP is determined according to information semi-statically configured or dynamically signaled from the first cell, or according to the received configurations from the second cell, or according to the starting time of the first FFP, or according to the starting time of a type of uplink resources, or a combination of the above.

In a fifth implementation form of the second aspect, the starting time of the second FFP indicates an offset relative to the starting time of the first FFP, a system frame boundary, or a system subframe boundary.

In a sixth implementation form of the second aspect in combination with the second implementation form of the second aspect, the COT period or the idle period of the second FFP is determined according to information semi-statically configured or dynamically signaled from the first cell, or according to the received configuration from the second cell, or according to the COT period or the idle period of the firs FFP, or according to predefined rules, or a combination of the above.

In a seventh implementation form of the second aspect in combination with the third or fourth implementation form of the second aspect, the type of uplink resources comprise a PRACH resource for random access, a PUSCH resource for configured grants, or a PUCCH resource for scheduling requests, CSI reporting, and HARQ feedbacks.

In an eighth implementation form of the second aspect, the controller is further configured to determine whether a downlink transmission from the first cell occurs within a duration subsequent to the starting time of the first FFP in which a second uplink resource is allocated, and perform another uplink transmission to the first cell using the second uplink resource in the first FFP via the wireless transceiver in response to the downlink transmission from the first cell occurring within the duration subsequent to the starting time of the first FFP, wherein the UE is operating as an initiating device upon initiating the uplink transmission according to the second FFP, and as a responding device upon initiating the other uplink transmission according to the first FFP.

In a third aspect of the application, a method executed by a UE operating in a FBE mode is provided. The method comprises the following steps: determining a FFP of a cell on an operating channel of an unlicensed band; determining whether a downlink transmission from the cell occurs within a first duration subsequent to a starting time of the FFP in which an uplink resource is allocated; and performing an uplink transmission to the cell using the uplink resource in the FFP in response to the downlink transmission from the cell occurring within the first duration subsequent to the starting time of the FFP.

In a first implementation form of the third aspect, the method further comprises the step of: performing an LBT procedure on the operating channel within a second duration prior to the start of the uplink transmission, wherein the uplink transmission is performed in response to the LBT procedure indicating that the operating channel is clear.

In a second implementation form of the third aspect, the FFP is determined according to Remaining Minimum System Information (RMSI) or dedicated Radio Resource Control (RRC) signaling from the cell.

In a third implementation form of the third aspect, the downlink transmission comprises at least one of the following: a De-Modulation Reference Signal (DMRS); a Synchronization Signal Block (SSB); a Channel State Information Reference Signal (CSI-RS); a Tracking Reference Signal (TRS); a Physical Downlink Control Channel (PDCCH) signal; a Physical Downlink Shared Channel (PDSCH) signal; a Group-Common PDCCH (GC-PDCCH) signal; a PDCCH DMRS; and a PDSCH DMRS.

Other aspects and features of the present application will become apparent to those with ordinarily skill in the art upon review of the following descriptions of specific embodiments of the apparatuses and the methods for uplink transmission in FBE operation.

BRIEF DESCRIPTION OF DRAWINGS

The application can be more fully understood by reading the subsequent detailed description and examples with references made to the accompanying drawings, wherein.

DETAILED DESCRIPTION OF THE APPLICATION

The following description is made for the purpose of illustrating the general principles of the application and should not be taken in a limiting sense. It should be understood that the embodiments may be realized in software, hardware, firmware, or any combination thereof. The terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Figure 1:
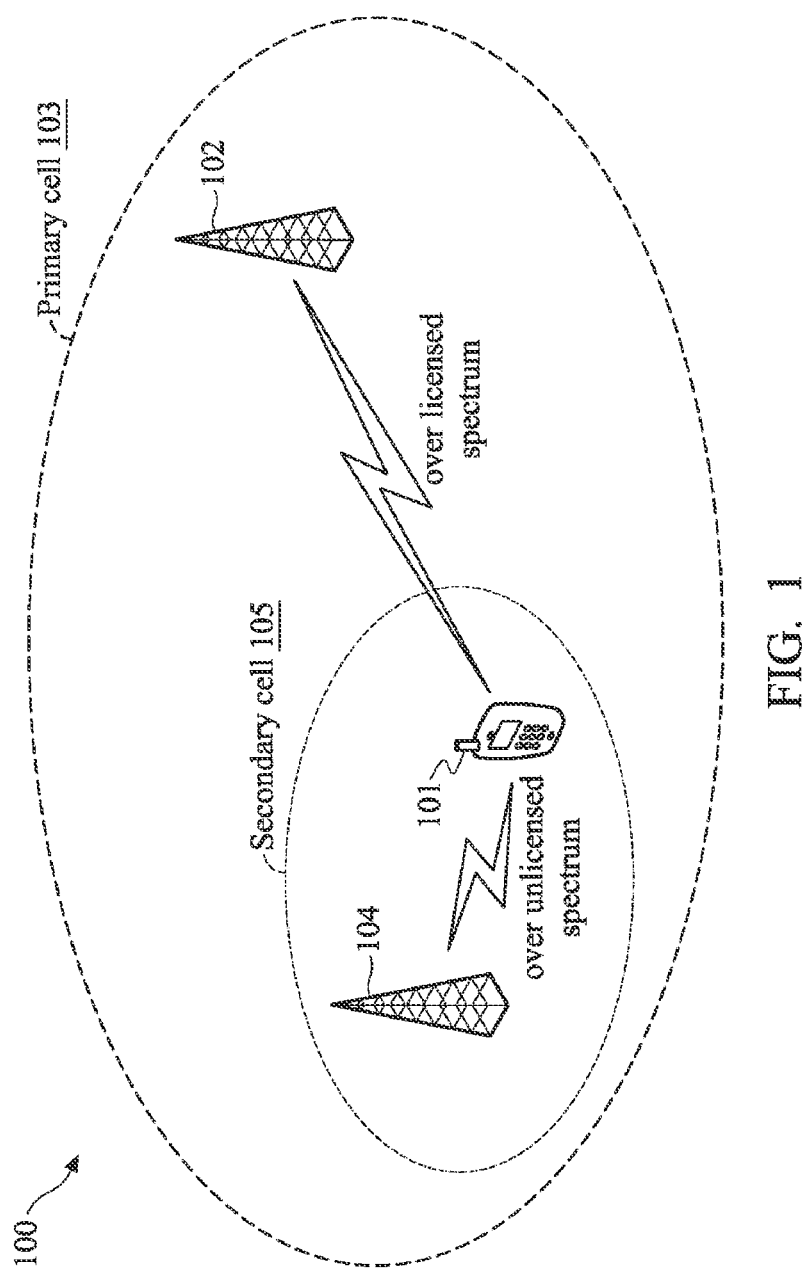
FIG. 1 is a block diagram of an exemplary Licensed Assisted Access (LAA) mobile communication system according to an embodiment of the application.

FIG. 1 is a block diagram of an exemplary Licensed Assisted Access (LAA) mobile communication system according to an embodiment of the application.

As shown in FIG. 1, the mobile communication system 100 may include one or more mobile communication networks, and each of the mobile communication networks has base infrastructure units, such as 102 and 104. Each of the base infrastructure units may also be referred to as an access point, an access terminal, a base station, or by other terminology used in the art. Each of the base stations 102 and 104 serves a geographic area. The geographic area served by the base stations 102 and 104 overlaps in this example. In another embodiment, the base station 102 and base station 104 may be co-located geographically.

In one embodiment, if the mobile communication network is a 5G NR network, each of the base stations 102 and 104 may be a next generation NodeBs (gNBs), which support licensed frequency band and/or unlicensed frequency band, and each gNB may further include one or more Transmission Reception Points (TRPs), wherein each gNB or TRP may be referred to as a 5G cellular station.

Specifically, the base station 102 provides wireless communication services to the UE 101 within the primary cell 103 via a licensed frequency band, while the base station 104 communicates with the UE 101 within the secondary cell 105 via an unlicensed frequency band. The secondary cell 105 may also be referred to as a "small cell". In one example, the base stations 102 and 104 communicate with the UE 101 via 5G NR wireless communication.

The UE 101 may be a feature phone, a smartphone, a panel Personal Computer (PC), a laptop computer, or any wireless communication device supporting the RAT (e.g., the 5G NR technology) utilized by the mobile communication network to which the base stations 102 and 104 belong.

The exponential growth in data consumption has created large bandwidth demands that cannot be met by legacy wireless systems. To meet this ever-increasing demand for more bandwidth, new wireless systems with greater available bandwidth are needed. LAA mobile communication systems can be used to provide greater available bandwidth. An LAA mobile communication system utilizes unlicensed frequency bands in addition to licensed frequency bands contemporaneously, thereby providing additional available bandwidth to the UEs in the LAA mobile communication system. For example, the UE 101 can benefit from simultaneous use of the licensed frequency band and the unlicensed frequency band in the mobile communication system 100. The LAA mobile communication system not only provides additional bandwidth for greater overall data communication, but also provides consistent data connectivity due to the presence of two separate communication links. Having multiple communication links available increases the probability that the UEs will be able to achieve proper data communication with at least one base station at any given moment. While utilization of the unlicensed spectrum provides more available bandwidth, the use of the unlicensed spectrum faces practical problems that need to be addressed.

One particular problem is that uplink transmissions are only supported in gNB-initiated COT. That is, the gNB always needs to perform the LBT procedure and transmit some downlink signals before any UE can transmit even when there are UL resources already configured by the gNB. This limitation will inevitably increase latency for uplink transmission and reduce overall radio resource utilization. In accordance with one novel aspect, UE-initiated COT for FBE operation is supported by allowing the UE 101 to operate as an initiating device with a deterministic Fixed Frame Period (FFP) to conduct an uplink transmission in a way that is compliant with the regional regulations (e.g., European Telecommunications Standards Institute (ETSI) regulation).

In the example of FIG. 1, for downlink LAA, the base station 104 performs LBT to contend channel ownership and initiates downlink data transmission. For uplink LAA, both the base station 104 and the UE 101 may perform LBT to contend channel ownership. For example, the base station 104 may perform LBT for Physical Downlink Control Channel (PDCCH) transmission or for some other downlink signals or/an channels transmission, to enable configured uplink resources for the UE 101, so that the UE 101 may perform Physical Uplink Shared Channel (PUSCH) transmission using the configured uplink resources after it has detected the downlink transmission from the base station and assumed the Channel Occupancy Time (COT) has acquired by the base station. That is, uplink transmission is supported in gNB-initiated COT. Alternatively, the UE 101 may proactively perform LBT to acquire a COT for uplink transmissions. Examples of uplink transmissions include Physical Random Access Channel (PRACH), Physical Uplink Control Channel (PUCCH), PUSCH, or Sounding Reference Signal (SRS) transmission. In this way, uplink transmission is supported in UE-initiated COT.

It should be understood that the mobile communication system 100 described in the embodiment of FIG. 1 is for illustrative purposes only and is not intended to limit the scope of the application. For example, the RAT utilized by the mobile communication system 100 may be a legacy technology (e.g., LTE/LTE-A/TD-LTE) of 5G NR, or a future enhancement of 5G NR (e.g., 6G/7G/8G).

Figure 2:
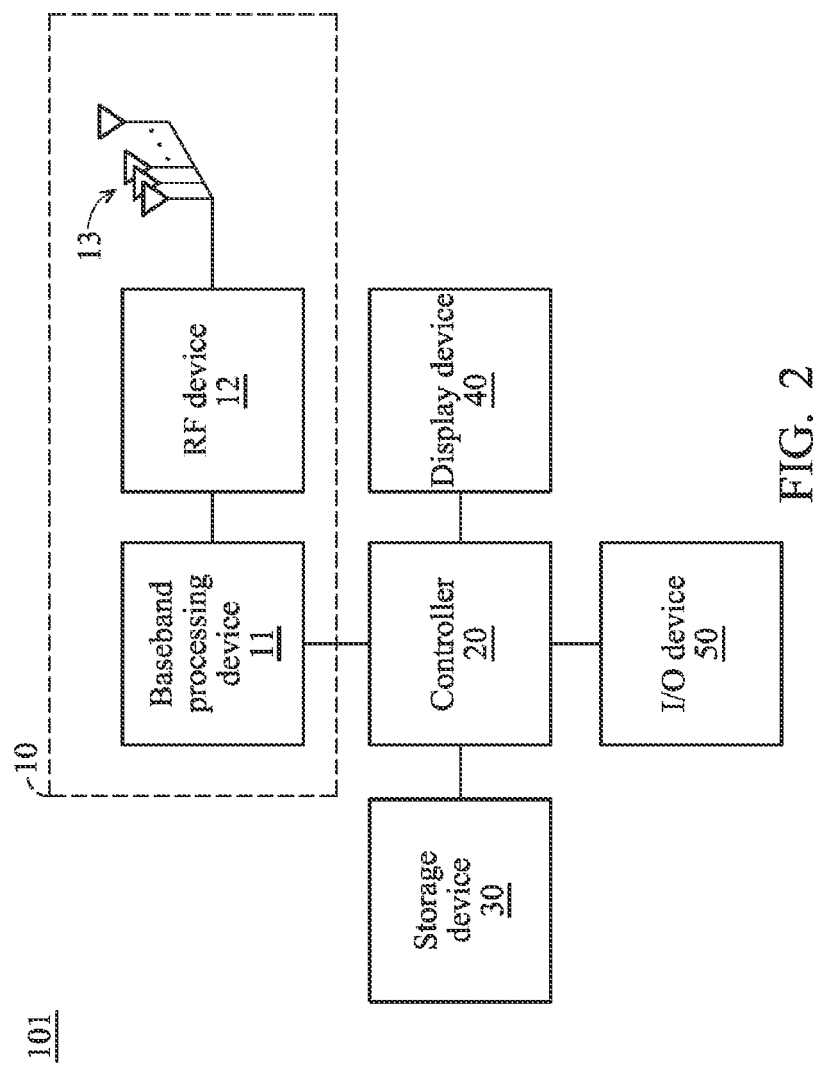
FIG. 2 is a block diagram illustrating the UE 101 according to an embodiment of the application.

FIG. 2 is a block diagram illustrating the UE 101 according to an embodiment of the application.

As shown in FIG. 2, the UE 101 may include a wireless transceiver 10, a controller 20, a storage device 30, a display device 40, and an Input/Output (I/O) device 50.

The wireless transceiver 10 is configured to perform wireless transmission and reception to and from the base stations 102 and 104.

Specifically, the wireless transceiver 10 may include a baseband processing device 11, a Radio Frequency (RF) device 12, and antenna 13, wherein the antenna 13 may include an antenna array for beamforming.

The baseband processing device 11 is configured to perform baseband signal processing and control the communications between subscriber identity card(s) (not shown) and the RF device 12. The baseband processing device 11 may contain multiple hardware components to perform the baseband signal processing, including Analog-to-Digital Conversion C)/Digital-to-Analog Conversion (DAC), gain adjusting, modulation/demodulation, encoding/decoding, and so on.

The RF device 12 may receive RF wireless signals via the antenna 13, convert the received RF wireless signals to baseband signals, which are processed by the baseband processing device 11, or receive baseband signals from the baseband processing device 11 and convert the received baseband signals to RF wireless signals, which are later transmitted via the antenna 13. The RF device 12 may also contain multiple hardware devices to perform radio frequency conversion. For example, the RF device 12 may comprise a mixer to multiply the baseband signals with a carrier oscillated in the radio frequency of the supported RAT(s), wherein the radio frequency may be any radio frequency (e.g., 30 GHz-300 GHz for mmWave, or 5 GHz for unlicensed band) utilized in the 5G NR technology, or may be 900 MHz, 2100 MHz, or 2.6 GHz utilized in LTE/LTE-A/TD-LTE technology, or another radio frequency, depending on the RAT in use.

The controller 20 may be a general-purpose processor, a Micro Control Unit (MCU), an application processor, a Digital Signal Processor (DSP), a Graphics Processing Unit (GPU), a Holographic Processing Unit (HPU), a Neural Processing Unit (NPU), or the like, which includes various circuits for providing the functions of data processing and computing, controlling the wireless transceiver 10 for wireless communication with the base stations 102 and 104, storing and retrieving data (e.g., program code) to and from the storage device 30, sending a series of frame data (e.g. representing text messages, graphics, images, etc.) to the display device 40, and receiving user inputs or outputting signals via the I/O device 50.

In particular, the controller 20 coordinates the aforementioned operations of the wireless transceiver 10, the storage device 30, the display device 40, and the I/O device 50 for performing the method of the present application.

In another embodiment, the controller 20 may be incorporated into the baseband processing device 11, to serve as a baseband processor.

As will be appreciated by persons skilled in the art, the circuits of the controller 20 will typically include transistors that are configured in such a way as to control the operation of the circuits in accordance with the functions and operations described herein. As will be further appreciated, the specific structure or interconnections of the transistors will typically be determined by a compiler, such as a Register Transfer Language (RTL) compiler. RTL compilers may be operated by a processor upon scripts that closely resemble assembly language code, to compile the script into a form that is used for the layout or fabrication of the ultimate circuitry. Indeed, RTL is well known for its role and use in the facilitation of the design process of electronic and digital systems.

The storage device 30 may be a non-transitory machine-readable storage medium, including a memory, such as a FLASH memory or a Non-Volatile Random Access Memory (NVRAM), or a magnetic storage device, such as a hard disk or a magnetic tape, or an optical disc, or any combination thereof for storing data (e.g., configuration received in the Remaining Minimum System Information (RMSI) or dedicated Radio Resource Control (RRC) signaling information), instructions, and/or program code of applications, communication protocols, and/or the method of the present application.

The display device 40 may be a Liquid-Crystal Display (LCD), a Light-Emitting Diode (LED) display, an Organic LED (OLED) display, or an Electronic Paper Display (EPD), etc., for providing a display function. Alternatively, the display device 40 may further include one or more touch sensors disposed thereon or thereunder for sensing touches, contacts, or approximations of objects, such as fingers or styluses.

The I/O device 50 may include one or more buttons, a keyboard, a mouse, a touch pad, a video camera, a microphone, and/or a speaker, etc., to serve as the Man-Machine Interface (MMI) for interaction with users.

It should be understood that the components described in the embodiment of FIG. 2 are for illustrative purposes only and are not intended to limit the scope of the application.

For example, a UE may include more components, such as a power supply, and/or a Global Positioning System (GPS) device, wherein the power supply may be a mobile/replaceable battery providing power to all the other components of the UE, and the GPS device may provide the location information of the UE for use by some location-based services or applications. Alternatively, a UE may include fewer components. For example, the UE may not include the display device 40 and/or the I/O device 50.

Figure 3:
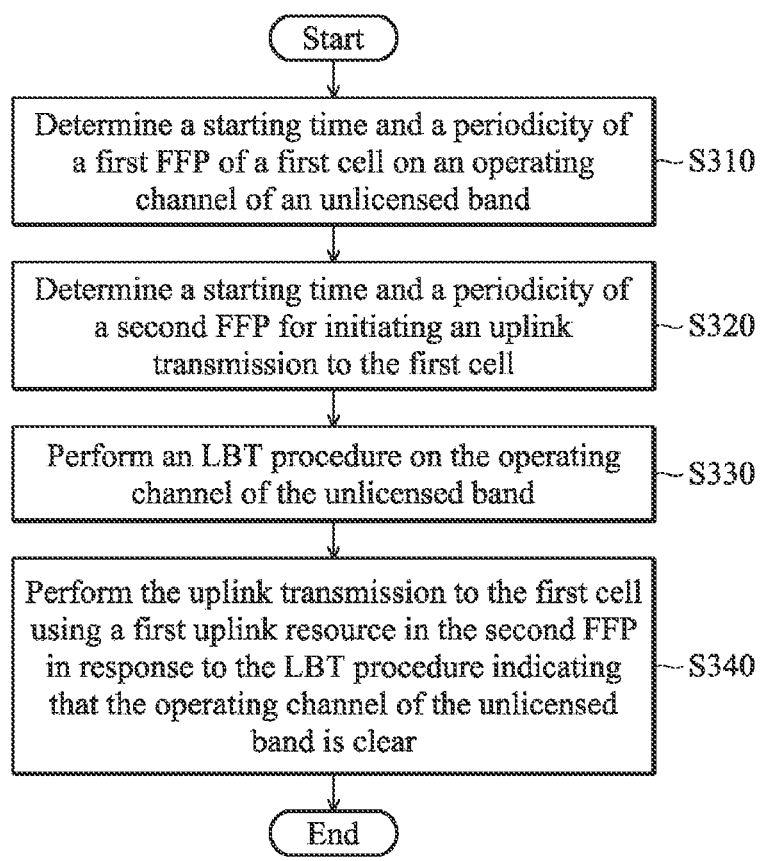
FIG. 3 is a flow chart illustrating the method for uplink transmission in FBE operation according to an embodiment of the application.

FIG. 3 is a flow chart illustrating the method for uplink transmission in FBE operation according to an embodiment of the application.

In this embodiment, the method may be applied to and executed by a UE (e.g., the UE 101) operating in the FBE mode. Specifically, when a UE is operating in the FBE mode, the transmit/receive structure has a periodic timing with a periodicity equal to a Fixed Frame Period (FFP).

To begin with, the UE determines a starting time and a periodicity of a first FFP of a first cell (e.g., the secondary cell 105) on an operating channel of an unlicensed band (step S310). Specifically, the first FFP is used for sharing a gNB-initiated COT.

The configuration of the first FFP may be signaled to the UE via broadcast information (e.g., the Remaining Minimum System Information (RMSI)) and/or dedicated signaling (e.g., Radio Resource Control (RRC) signaling). Note that the starting time of the first FFP is assumed to be at the system frame/subframe boundary.

Next, the UE determines a starting time and a periodicity of a second FFP for initiating an uplink transmission to the first cell (step S320).

Specifically, the second FFP is used for acquiring a UE-initiated COT for uplink transmission, and the starting time of the second FFP indicates an offset relative to the starting time of the first FFP, a system frame boundary, or a system subframe boundary.

In one embodiment, the UE may also receive configurations from a second cell on an operating channel of a licensed band or an unlicensed band, wherein the second cell can be the same or different from the first cell.

To further clarify, the periodicity of the second FFP may be determined according to information configured or signaled from the first cell, or according to the received configuration from the second cell, or according to the periodicity of the first FFP, or according to a periodicity of a type of uplink resources, or a combination of the above. The starting time of the second FFP may be determined according to information semi-statically configured or dynamically signaled from the first cell, or according to the received configuration from the second cell, or according to the starting time of the first FFP, or according to the starting time of a type of uplink resources, or a combination of the above. The COT period or the idle period of the second FFP may be determined according to information semi-statically configured or dynamically signaled from the first cell, or according to the received configuration from the second cell, or according to the COT period or the idle period of the firs FFP, or according to predefined rules, or a combination of the above. For example, the idle period of the second FFP may be determined as a ratio of the periodicity of the second FFP, wherein the ratio may be predefined in the 3GPP specification(s) or configured by the cell. Alternatively, the idle period of the second FFP may be set to a value not smaller than a predefined value.

For example, the information configured or signaled from the first cell may be broadcast information or dedicate signaling information.

For example, the type of uplink resources may refer to Physical Random Access Channel (PRACH) resources for random access, Physical Uplink Shared Channel (PUSCH) resources for configured grants, or Physical Uplink Control Channel (PUCCH) resources for scheduling requests, Channel State Information (CSI) reporting, and Hybrid Automatic Repeat Request (HARQ) feedbacks, which are configured based on the first cell's broadcast information (e.g., the RMSI).

Subsequently, the UE performs an LBT procedure on the operating channel of the unlicensed band (step S330).

Specifically, the LBT procedure is performed within a duration immediately prior to the starting time of the second FFP.

After that, the UE performs an uplink transmission to the first cell using a first uplink resource in the second FFP in response to the LBT procedure indicating that the operating channel of the unlicensed band is clear (step S340), and the method ends.

Specifically, the uplink transmission may be a PRACH transmission, a PUSCH transmission, a PUCCH transmission, or a SRS transmission.

It should be noted that the UE is operating as an initiating device upon initiating the uplink transmission according to the second FFP.

Figure 4:
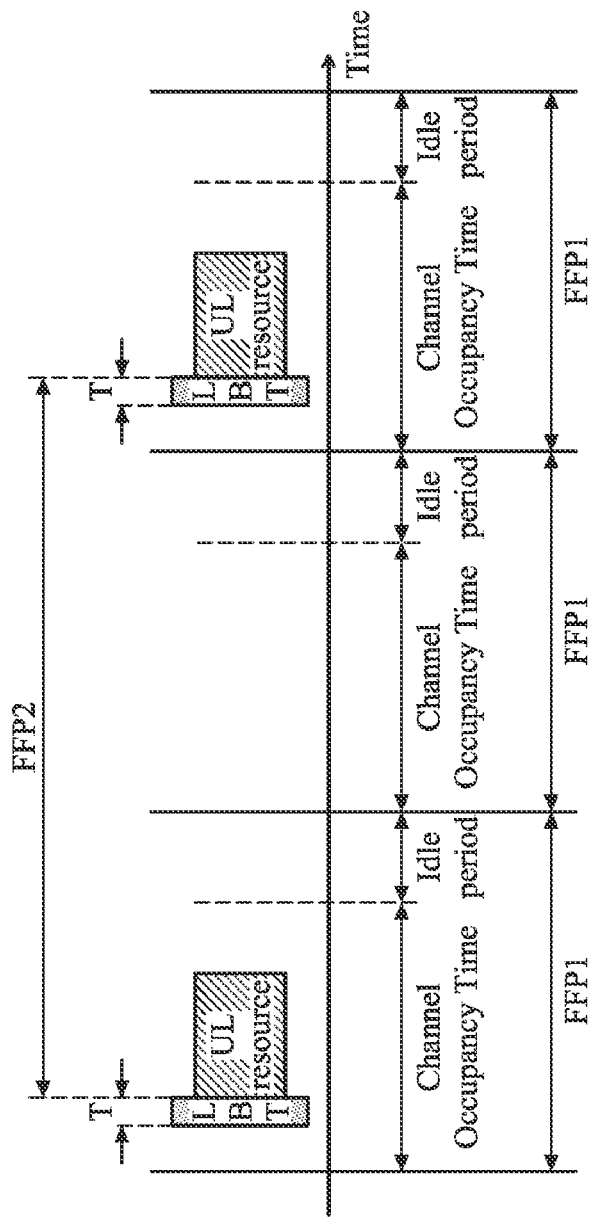
FIG. 4 is a schematic diagram illustrating the support of UE-initiated COT for FBE operation according to a first embodiment of the application.

FIG. 4 is a schematic diagram illustrating the support of UE-initiated COT for FBE operation according to a first embodiment of the application.

As shown in FIG. 4, the UE determines a first FFP (denoted as FFP1 in FIG. 4) according to the downlink signaling (e.g., RMSI or RRC signaling) received from the cell, as the UE is operating as a responding device for FBE operation. In addition to the first FFP, the UE also determines a second FFP (denoted as FFP2 in FIG. 4) according to the period of a type of uplink resources (e.g., PRACH resources, PUSCH resources, or PUCCH resources), as the UE is also operating as an initiating device for FBE operation. Specifically, the starting time and the periodicity of the second FFP are determined to be equal to the starting time and the periodicity of a type of uplink resources, respectively.

When the UE wants to transmit uplink signal/data, it performs a Listen-Before-Talk (LBT) procedure within a duration (denoted as T in FIG. 4) immediately prior to the start of the uplink resources. Specifically, the LBT procedure may include one or more Clear Channel Access (CCA) assessments for checking if the operating channel is clear.

If the LBT procedure indicates that the operating channel is clear, it means that the UE acquires a COT on its own (i.e., a UE-initiated COT), and the UE may proceed to perform uplink transmissions in the UE-initiated COT rather than sharing a gNB-initiated COT.

Figure 5:
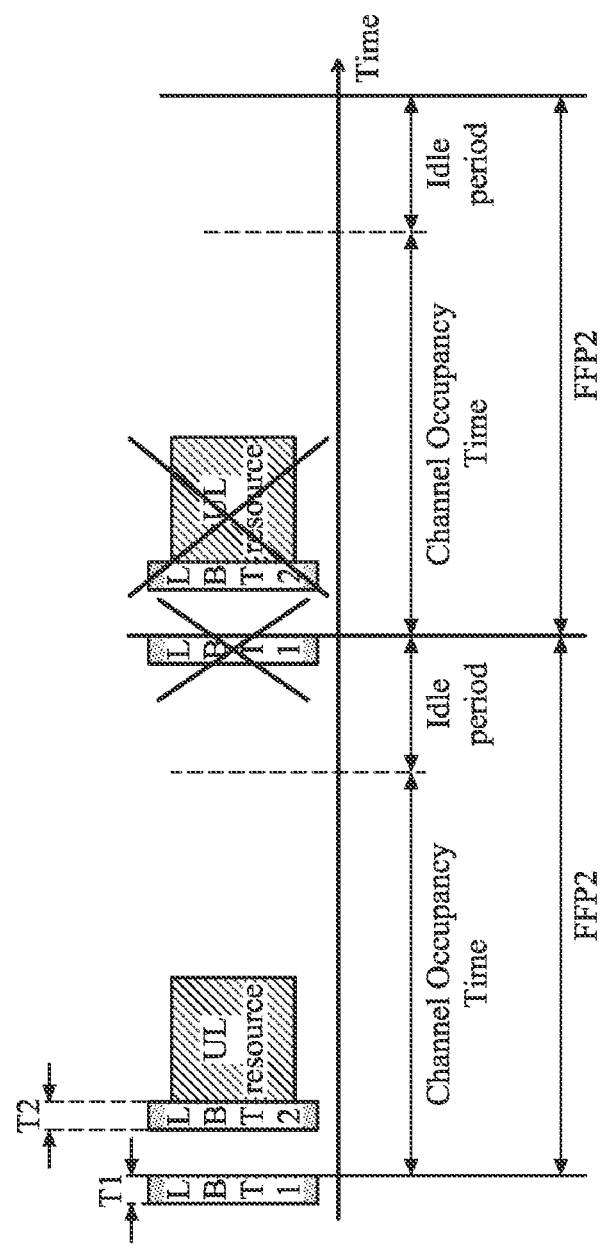
FIG. 5 is a schematic diagram illustrating the support of UE-initiated COT for FBE operation according to a second embodiment of the application.

FIG. 5 is a schematic diagram illustrating the support of UE-initiated COT for FBE operation according to a second embodiment of the application.

As shown in FIG. 5, the second FFP (denoted as FFP2 in FIG. 5) may be determined to be the same as the first FFP, or different from the first FFP.

When the UE wants to transmit uplink signal/data, it performs a first LBT procedure (denoted as LBT1) within a first duration (denoted as T1 in FIG. 5) immediately prior to the start of an FFP. If the first LBT procedure indicates that the operating channel is clear, it means that the UE acquires a COT on its own (i.e., a UE-initiated COT). If the UE does not wish to perform the uplink transmission immediately upon acquiring the UE-initiated COT or the configured uplink resource is scheduled some time away from the start of the FFP, the UE needs to perform a second LBT procedure (denoted as LBT2) with a second duration (denoted as T2 in FIG. 5) prior to an uplink resource in the frame. If the second LBT procedure indicates that the operating channel is clear, the UE may perform uplink transmissions on the uplink resource.

Otherwise, if the first LBT procedure for the next frame fails (i.e., the operating channel is occupied), the UE is not allowed to use the uplink resource in that frame for uplink transmissions, and thus, the second LBT procedure in that frame may be skipped.

The first duration (T1) and the second duration (T2) may be configured to be the same or different.

Figure 6:
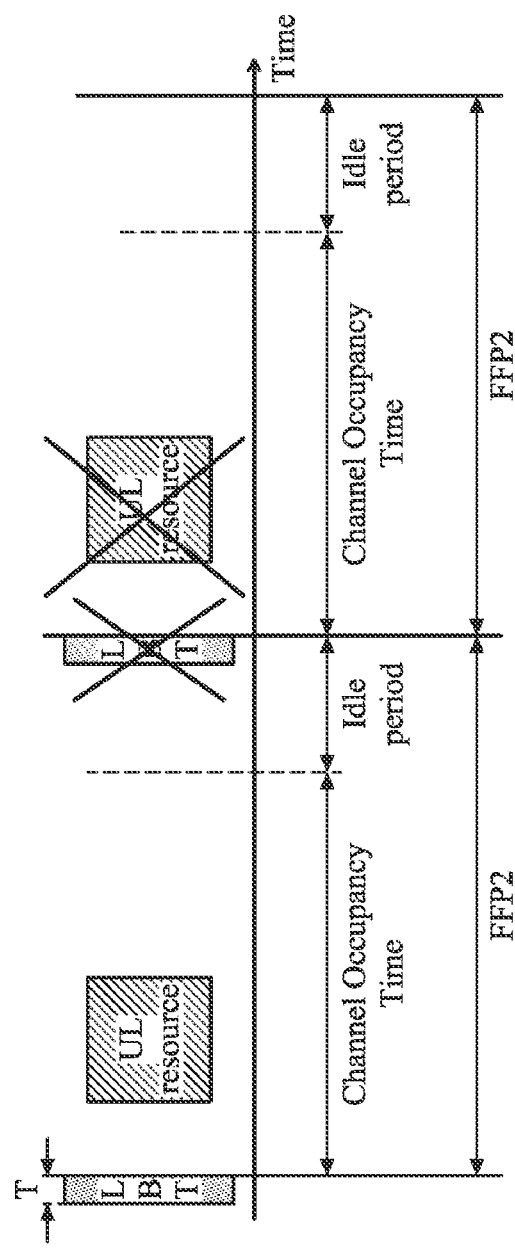
FIG. 6 is a schematic diagram illustrating the support of UE-initiated COT for FBE operation according to a third embodiment of the application.

FIG. 6 is a schematic diagram illustrating the support of UE-initiated COT for FBE operation according to a third embodiment of the application.

As shown in FIG. 6, the second FFP (denoted as FFP2 in FIG. 5) is determined to be the same as the first FFP, or different from the first FFP.

When the UE wants to transmit uplink signal/data, it performs an LBT procedure (denoted as LBT) within a duration (denoted as T in FIG. 6) immediately prior to the start of an FFP. If the LBT procedure indicates that the operating channel is clear, it means that the UE acquires a COT on its own (i.e., a UE-initiated COT), and the UE proceeds to perform uplink transmissions on an uplink resource in the frame, without the need to perform another LBT procedure before the uplink transmissions.

Otherwise, if the LBT procedure for the next frame fails (i.e., the operating channel is occupied), the UE is not allowed to use the uplink resource in that frame for uplink transmissions.

Figure 7:
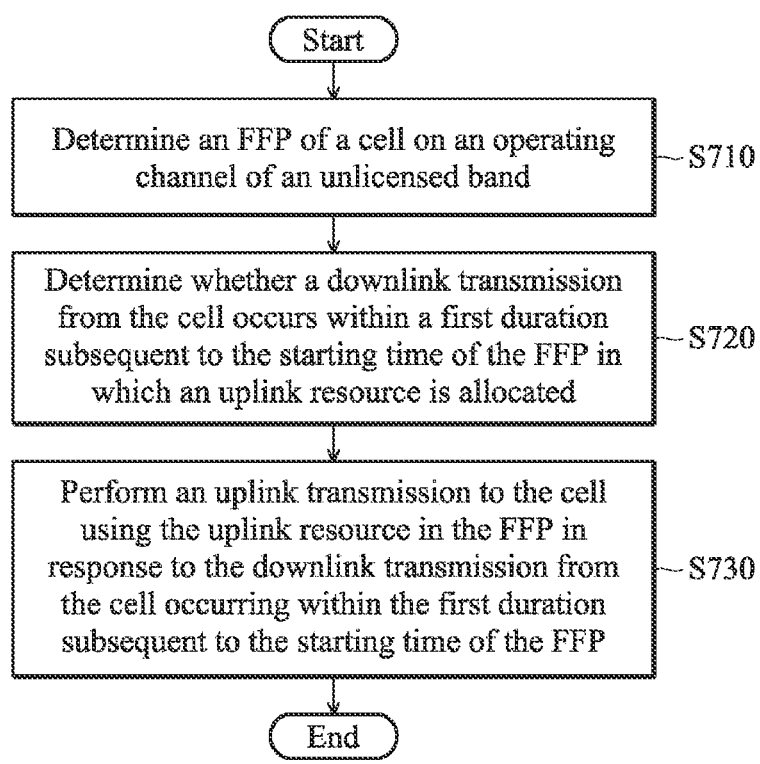
FIG. 7 is a flow chart illustrating the method for uplink transmission in FBE operation according to another embodiment of the application.

FIG. 7 is a flow chart illustrating the method for uplink transmission in FBE operation according to another embodiment of the application.

In this embodiment, the method may be applied to and executed by a UE (e.g., the UE 101) operating in the FBE mode.

To begin with, the UE determine an FFP of a cell (e.g., the secondary cell 105) on an operating channel of an unlicensed band (step S710).

Specifically, the FFP is determined according to the RMSI or dedicated RRC signaling from the cell.

Next, the UE determines whether a downlink transmission from the cell occurs within a first duration subsequent to the staring time of the FFP in which an uplink resource is allocated (step S720).

Specifically, the downlink transmission includes at least one of the following: a De-Modulation Reference Signal (DMRS), a Synchronization Signal Block (SSB), a Channel State Information Reference Signal (CSI-RS), a Tracking Reference Signal (TRS), a Physical Downlink Control Channel (PDCCH) signal, a Physical Downlink Shared Channel (PDSCH) signal, a Group-Common PDCCH (GC-PDCCH) signal, a PDCCH DMRS, and a PDSCH DMRS.

After that, the UE performs an uplink transmission to the cell using the uplink resource in the FFP in response to the downlink transmission from the cell occurring within the first duration subsequent to the starting time of the FFP (step S730), and the method ends.

Figure 8:
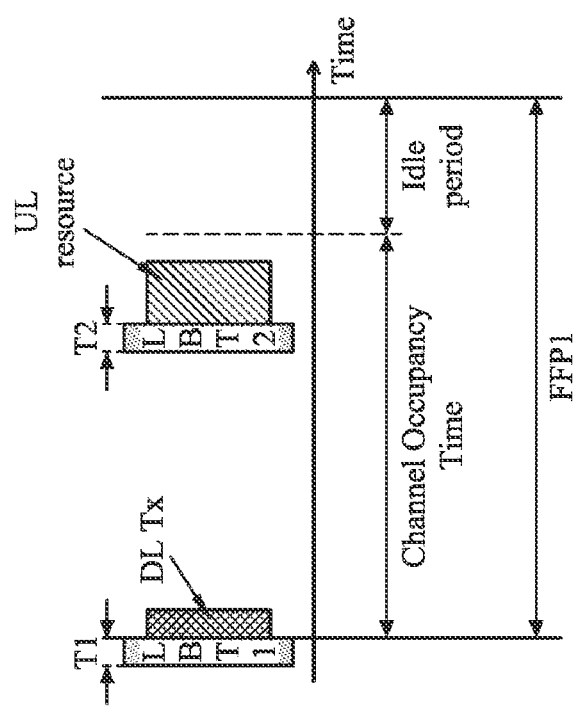
FIG. 8 is a schematic diagram illustrating the support of UE-initiated COT for FBE operation according to a fourth embodiment of the application.

FIG. 8 is a schematic diagram illustrating the support of UE-initiated COT for FBE operation according to a fourth embodiment of the application.

As shown in FIG. 8, the UE determines the first FFP (denoted as FFP1 in FIG. 8) according to the downlink signaling (e.g., RMSI or RRC signaling) received from the cell, as the UE is operating as a responding device for FBE operation.

At the start of each FFP, the UE assumes that the gNB has performed a first LBT procedure (denoted as LBT1 in FIG. 8) successfully, so the UE monitors if there's a downlink transmission from the cell. That is, the UE is required to detect/decode at least a downlink transmission that may occur in the frame. If there's a downlink transmission in the frame, the UE performs a second LBT procedure (denoted as LBT2 in FIG. 8) within a duration (denoted as T in FIG. 8) immediately prior to the start of an uplink resource. If the second LBT procedure indicates that the operating channel is clear, it means that the UE is allowed to share the gNB-initiated COT and performs uplink transmissions using the uplink resource.

The second LBT procedure may be configured as a one-shot LBT or no-LBT (i.e., the second LBT procedure may be skipped), based on the indication by a scheduling PDCCH. The first duration (T1) and the second duration (T2) may be configured to be the same or different.

Figure 9:
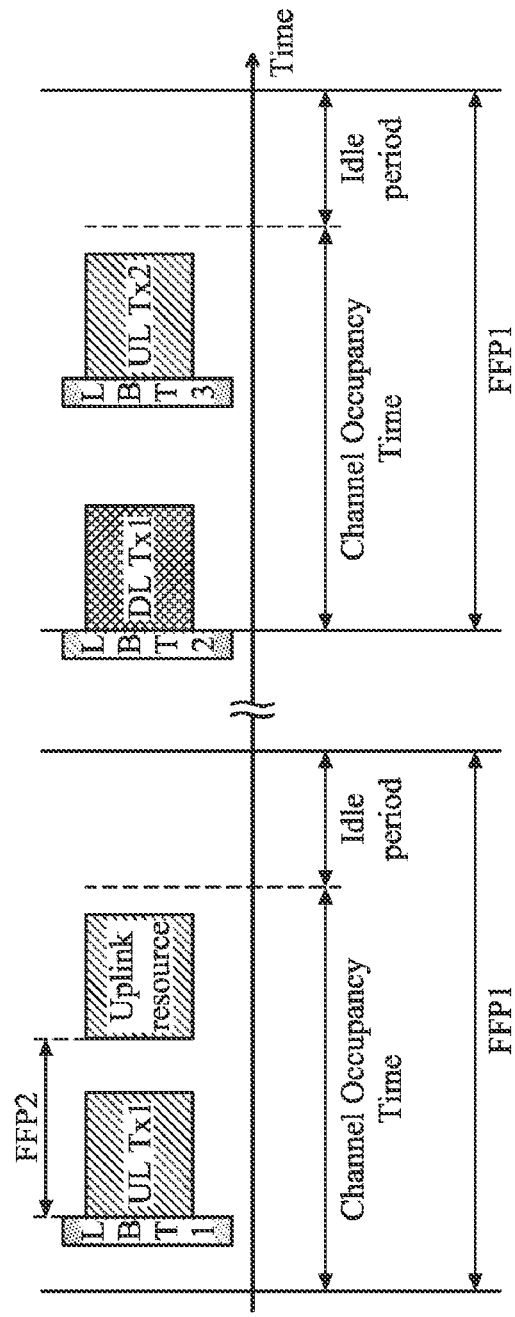
FIG. 9 is a schematic diagram illustrating the support of UE-initiated COT for FBE operation according to a fifth embodiment of the application.

FIG. 9 is a schematic diagram illustrating the support of UE-initiated COT for FBE operation according to a fifth embodiment of the application.

As shown in FIG. 9, the UE determines a first FFP (denoted as FFP1 in FIG. 9) according to the downlink signaling received from the cell, as the UE is operating as a responding device for FBE operation. In addition to the first FFP, the UE also determines a second FFP (denoted as FFP2 in FIG. 9), as the UE is also operating as an initiating device for FBE operation.

Specifically, the second FFP starts from a duration subsequent to the start of the first FFP, and ends before the start of the uplink resources in the first FFP. The starting time, the periodicity, the COT period, and/or the idle period of the second FFP may be explicitly configured or signaled by the cell.

When the UE wants to initiate a first uplink transmission, it performs a first LBT procedure (denoted as LBT1 in FIG. 9) within a duration immediately prior to the start of the second FFP. If the first LBT procedure indicates that the operating channel is clear, it means that the UE acquires a COT on its own (i.e., a UE-initiated COT), and the UE proceeds to perform the first uplink transmission (denoted as UL Tx1 in FIG. 9) in the UE-initiated COT. That is, the UE is operating as an initiating device for initiating the first uplink transmission according to the second FFP.

Next, the UE is operating as a responding device for initiating a second uplink transmission according to the first FFP. At the start of the next FFP1, the UE assumes that the gNB has performed a second LBT procedure (denoted as LBT2 in FIG. 9) successfully, and the UE detects a downlink transmission (denoted as DL Tx1 in FIG. 9) from the cell in the first FFP. In response to detecting the downlink transmission, the UE performs a third LBT procedure (denoted as LBT3 in FIG. 9) within a duration immediately prior to the start of an uplink resource in the first FFP. If the third LBT procedure indicates that the operating channel is clear, it means that the UE is allowed to share the gNB-initiated COT and perform the second uplink transmission (denoted as UL Tx2 in FIG. 9) using the uplink resource.

In one example, the first uplink transmission may include the Msg-1 of a contention-based random access procedure, the downlink transmission may include the Msg-2 of the contention-based random access procedure, and the second uplink transmission may include the Msg-3 of the contention-based random access procedure.

Figure 10:
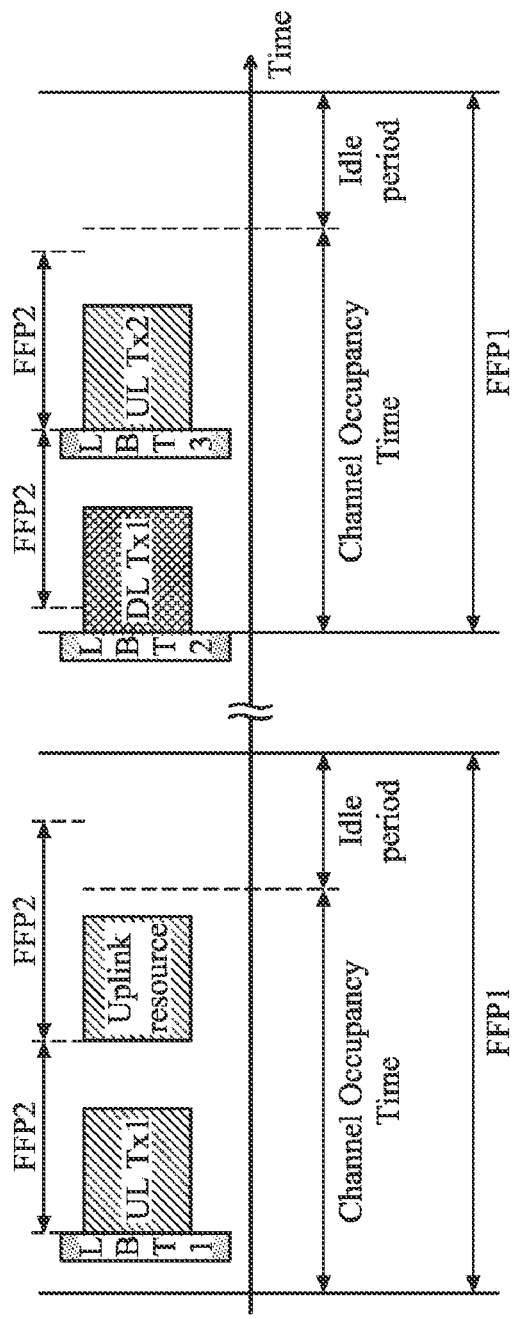
FIG. 10 is a schematic diagram illustrating the support of UE-initiated COT for FBE operation according to a sixth embodiment of the application.

FIG. 10 is a schematic diagram illustrating the support of UE-initiated COT for FBE operation according to a sixth embodiment of the application.

Similar to the embodiment of FIG. 9, the UE is first operating as an initiating device for initiating a first uplink transmission (denoted as UL Tx1 in FIG. 10) according to the second FFP, and then in the next FFP1, operating as a responding device for initiating a second uplink transmission (denoted as UL Tx2 in FIG. 10) conditioned on a downlink transmission (denoted as DL Tx1 in FIG. 10) previously conducted in the same first FFP.

Different from the embodiment of FIG. 9, the scheduled uplink grant (i.e., uplink resource) used for the second uplink transmission is configured by the cell to align with the starting time of the second FFP, and the UE can perform the second uplink transmission once it passes the LBT procedure (denoted as LBT3 in FIG. 10) beforehand.

Figure 11:
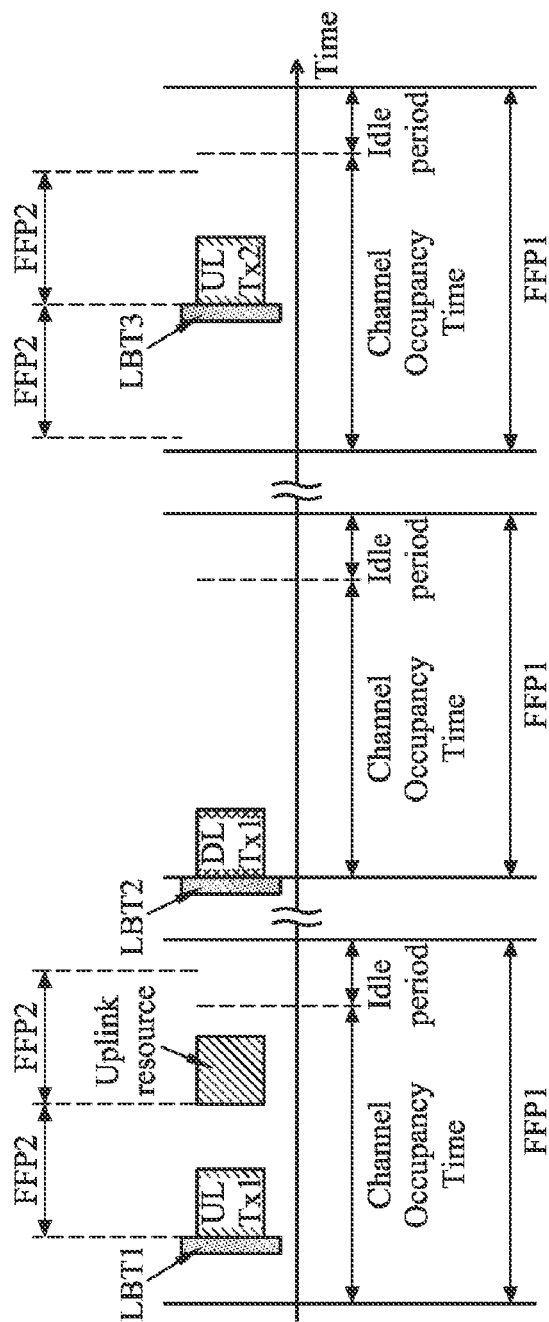
FIG. 11 is a schematic diagram illustrating the support of UE-initiated COT for FBE operation according to a seventh embodiment of the application.

FIG. 11 is a schematic diagram illustrating the support of UE-initiated COT for FBE operation according to a seventh embodiment of the application.

Similar to the embodiment of FIG. 10, the UE is first operating as an initiating device for initiating a first uplink transmission (denoted as UL Tx1 in FIG. 11) according to the second FFP, and then in the next FFP1, operating as a responding device for detecting a downlink transmission (denoted as DL Tx1 in FIG. 11) according to the first FFP.

Different from the embodiment of FIG. 10, the scheduled uplink grant (i.e., uplink resource) used for the second uplink transmission is configured in a different FFP1 than the FFP1 in which the downlink transmission occurs. That is, in the case of the first uplink transmission including the Msg-1, the downlink transmission including the Msg-2, and the second uplink transmission including the Msg-3, the Msg-1~Msg-3 of the same RACH procedure are transmitted or received in different fixed frame periods.

While the application has been described by way of example and in terms of preferred embodiment, it should be understood that the application is not limited thereto. Those who are skilled in this technology can still make various alterations and modifications without departing from the scope and spirit of this application. Therefore, the scope of the present application shall be defined and protected by the following claims and their equivalents.

Use of ordinal terms such as "first", "second", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

The invention claimed is:

1. A method, executed by a User Equipment (UE) operating in a Frame-Based Equipment (FBE) mode, comprising:
   determining a starting time and a periodicity of a first Fixed Frame Period (FFP) of a first cell on an operating channel of an unlicensed band, wherein the first FFP is used for indicating a gNB-initiated channel occupancy time (COT);
   determining a starting time and a periodicity of a second FFP for initiating an uplink transmission to the first cell, wherein the second FFP is used for a UE-initiated COT for the uplink transmission;
   performing a Listen-Before-Talk (LBT) procedure on the operating channel of the unlicensed band; and
   performing the uplink transmission to the first cell using a first uplink resource in the second FFP in response to the LBT procedure indicating that the operating channel of the unlicensed band is clear.

2. The method of claim 1, further comprising:
   determining a Channel Occupancy Time (COT) period or an idle period of the first FFP; and
   determining a COT period or an idle period of the second FFP.

3. The method of claim 1, wherein the starting time of the second FFP indicates an offset relative to the starting time of the first FFP, a system frame boundary, or a system subframe boundary.

4. The method of claim 1, further comprising:
   determining whether a downlink transmission from the first cell occurs within a duration subsequent to the starting time of the first FFP in which a second uplink resource is allocated; and
   performing another uplink transmission to the first cell using the second uplink resource in the first FFP in response to the downlink transmission from the first cell occurring within the duration subsequent to the starting time of the first FFP;
   wherein the UE is operating as an initiating device upon initiating the uplink transmission according to the second FFP, and as a responding device upon initiating the other uplink transmission according to the first FFP.

5. The method of claim 2, further comprising:
   receiving configurations from a second cell on an operating channel of a licensed band or an unlicensed band, wherein the second cell is the same or different from the first cell.

6. The method of claim 5, wherein the periodicity of the second FFP is determined according to at least one of the following:
   information configured or signaled from the first cell;
   the received configurations from the second cell;
   the periodicity of the first FFP; and
   a periodicity of a type of uplink resources.

7. The method of claim 5, wherein the starting time of the second FFP is determined according to at least one of the following:
   information semi-statically configured or dynamically signaled from the first cell;
   the received configurations from the second cell;
   the starting time of the first FFP; and
   the starting time of a type of uplink resources.

8. The method of claim 5, wherein the COT period or the idle period of the second FFP is determined according to at least one of the following:
   information semi-statically configured or dynamically signaled from the first cell;
   the received configurations from the second cell;
   the COT period or the idle period of the firs FFP;
   predefined rules.

9. A User Equipment (UE), operating in a Frame-Based Equipment (FBE) mode, comprising:
   a wireless transceiver, configured to perform wireless transmission and reception to and from a first cell of a mobile communication network; and
   a controller, coupled to the wireless transceiver, and configured to determine a starting time and a periodicity of a first Fixed Frame Period (FFP) of the first cell on an operating channel of an unlicensed band, determine a starting time and a periodicity of a second FFP for initiating an uplink transmission to the first cell, perform a Listen-Before-Talk (LBT) procedure on the operating channel of the unlicensed band via the wireless transceiver, and perform the uplink transmission to the first cell using a first uplink resource in the second FFP via the wireless transceiver in response to the LBT procedure indicating that the operating channel of the unlicensed band is clear, wherein the first FFP is used for indicating a gNB-initiated channel occupancy time (COT), and wherein the second FFP is used for a UE-initiated COT for the uplink transmission.

10. The UE of claim 9, wherein the controller is further configured to determine a COT period or an idle period of the first FFP, and determine a COT period or an idle period of the second FFP.

11. The UE of claim 9, wherein the starting time of the second FFP indicates an offset relative to the starting time of the first FFP, a system frame boundary, or a system subframe boundary.

12. The UE of claim 9, wherein the controller is further configured to determine whether a downlink transmission from the first cell occurs within a duration subsequent to the starting time of the first FFP in which a second uplink resource is allocated, and perform another uplink transmission to the first cell using the second uplink resource in the first FFP via the wireless transceiver in response to the downlink transmission from the first cell occurring within the duration subsequent to the starting time of the first FFP; wherein the UE is operating as an initiating device upon initiating the uplink transmission according to the second FFP, and as a responding device upon initiating the other uplink transmission according to the first FFP.

13. The UE of claim 10, wherein the controller is further configured to receive configurations from a second cell on an operating channel of a licensed band or an unlicensed band wherein the second cell is the same or different from the first cell.

14. The UE of claim 13, wherein the periodicity of the second FFP is determined according to at least one of the following:
information configured or signaled from the first cell;
the received configuration from the second cell;
the periodicity of the first FFP; and
a periodicity of a type of uplink resources.

15. The UE of claim 13, wherein the starting time of the second FFP is determined according to at least one of the following:
information semi-statically configured or dynamically signaled from the first cell;
the received configuration from the second cell;
the starting time of the first FFP; and
the starting time of a type of uplink resources.

16. The UE of claim 13, wherein the COT period or the idle period of the second FFP is determined according to at least one of the following:
information semi-statically configured or dynamically signaled from the first cell;
the received configuration from the second cell;
the COT period or the idle period of the firs FFP; and
predefined rules.

* * * * *